(12) United States Patent
Sathavalli et al.

(10) Patent No.: US 11,016,863 B2
(45) Date of Patent: May 25, 2021

(54) SELF-CONTAINED DISASTER DETECTION FOR REPLICATED MULTI-CONTROLLER SYSTEMS

(71) Applicant: EMC IP Holding Company LLC, Hopkinton, MA (US)

(72) Inventors: Bharadwaj R. Sathavalli, Bangalore (IN); Shampavman Chenjeri Gururajarao, Bangalore (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 206 days.

(21) Appl. No.: 16/403,192

(22) Filed: May 3, 2019

(65) Prior Publication Data

US 2020/0349036 A1 Nov. 5, 2020

(51) Int. Cl.
*G06F 11/07* (2006.01)
*G06F 11/20* (2006.01)
*G06F 11/30* (2006.01)
*G06F 11/14* (2006.01)

(52) U.S. Cl.
CPC ...... *G06F 11/2025* (2013.01); *G06F 11/0712* (2013.01); *G06F 11/1471* (2013.01); *G06F 11/301* (2013.01)

(58) Field of Classification Search
CPC .................. G06F 11/0712; G06F 11/2025
See application file for complete search history.

(56) References Cited

U.S. PATENT DOCUMENTS 7,392,421 B1* 6/2008 Bloomstein ......... G06F 11/1482
714/4.4
10,891,069 B2* 1/2021 Ashraf ................... G06F 3/061

* cited by examiner

*Primary Examiner* — Matthew M Kim
*Assistant Examiner* — Kyle Emanuele
(74) *Attorney, Agent, or Firm* — Amin, Turocy & Watson, LLP

(57) ABSTRACT

Self-contained disaster detection for replicated multi-controller systems is described herein. A system as described herein can include a memory that stores computer executable components and a processor that executes computer executable components stored in the memory. The computer executable components can include a data synchronization component that replicates data written at a primary production site, resulting in replicated data from the primary production site; a status monitoring component that reads status identifiers contained in the replicated data at periods of a time interval, wherein the status identifiers are written by respective controllers at the primary production site; and a disaster recovery component that initializes a failover procedure at the primary production site in response to an absence of updates to a first threshold number of the status identifiers within a second threshold number of the periods.

20 Claims, 10 Drawing Sheets

SELF-CONTAINED DISASTER DETECTION FOR REPLICATED MULTI-CONTROLLER SYSTEMS

TECHNICAL FIELD

The subject application is related to data storage systems, and more particularly, to techniques for improving disaster detection and recovery in a data storage system.

BACKGROUND

Distributed computing systems can enable performance of various functions associated with a computing system to be distributed among multiple computing devices in order to provide improvements in speed, scalability, reliability, and/or other metrics in comparison to single-device systems. In some cases, components of a distributed computing system can be deployed at respective computing sites in different physical locations in order to provide further benefits to scalability, data protection, or the like. For instance, in the event that a single site failure occurs in a distributed computing system, data stored by the failed site and/or functionality of the failed site can be migrated to one or more other sites associated with the system via a failover or disaster recovery procedure. Because the amount of data transferred during a disaster recovery procedure is often very large, such a procedure can introduce a large amount of risk (e.g., due to transmission errors or the like) and/or resource cost (e.g., network bandwidth, disk activity, power usage, etc.), which in turn can cause disruptions to the functional portions of the system. It is therefore desirable to develop techniques that can more accurately determine when a physical site of a distributed computing system has failed in order to reduce risks and/or costs associated with unnecessary site recovery procedures.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a system is described herein. The system includes a memory that stores executable components and a processor that executes the executable components stored in the memory. The executable components can include a data synchronization component that replicates data written at a primary production site, resulting in replicated data from the primary production site, a status monitoring component that reads status identifiers contained in the replicated data at periods of a time interval, where the status identifiers are written by respective controllers at the primary production site, and a disaster recovery component that initializes a failover procedure at the primary production site in response to an absence of updates to a first threshold number of the status identifiers within a second threshold number of the periods.

In another aspect, a method is described herein. The method can include mirroring, by a device operatively coupled to a processor, data written at a primary computing site, resulting in mirrored data from the primary computing site, reading, by the device, status indicators contained in the mirrored data at periods of a time interval, where the status indicators are written by respective controllers at the primary computing site, and initializing, by the device, a disaster recovery procedure at the primary computing site in response to an absence of updates to a first threshold number of the status indicators within a second threshold number of the periods.

In an additional aspect, a machine-readable medium including executable instructions is described herein. The instructions, when executed by a processor of a replicated computing site, can facilitate performance of operations including creating a local copy of data written at a primary computing site, reading status identifiers contained in the local copy of the data written at the primary computing site at periods of a time interval, where the status identifiers are written by respective controllers at the primary computing site, and triggering a disaster recovery procedure at the primary computing site in response to an absence of updates to a first threshold number of the status identifiers within a second threshold number of the periods.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
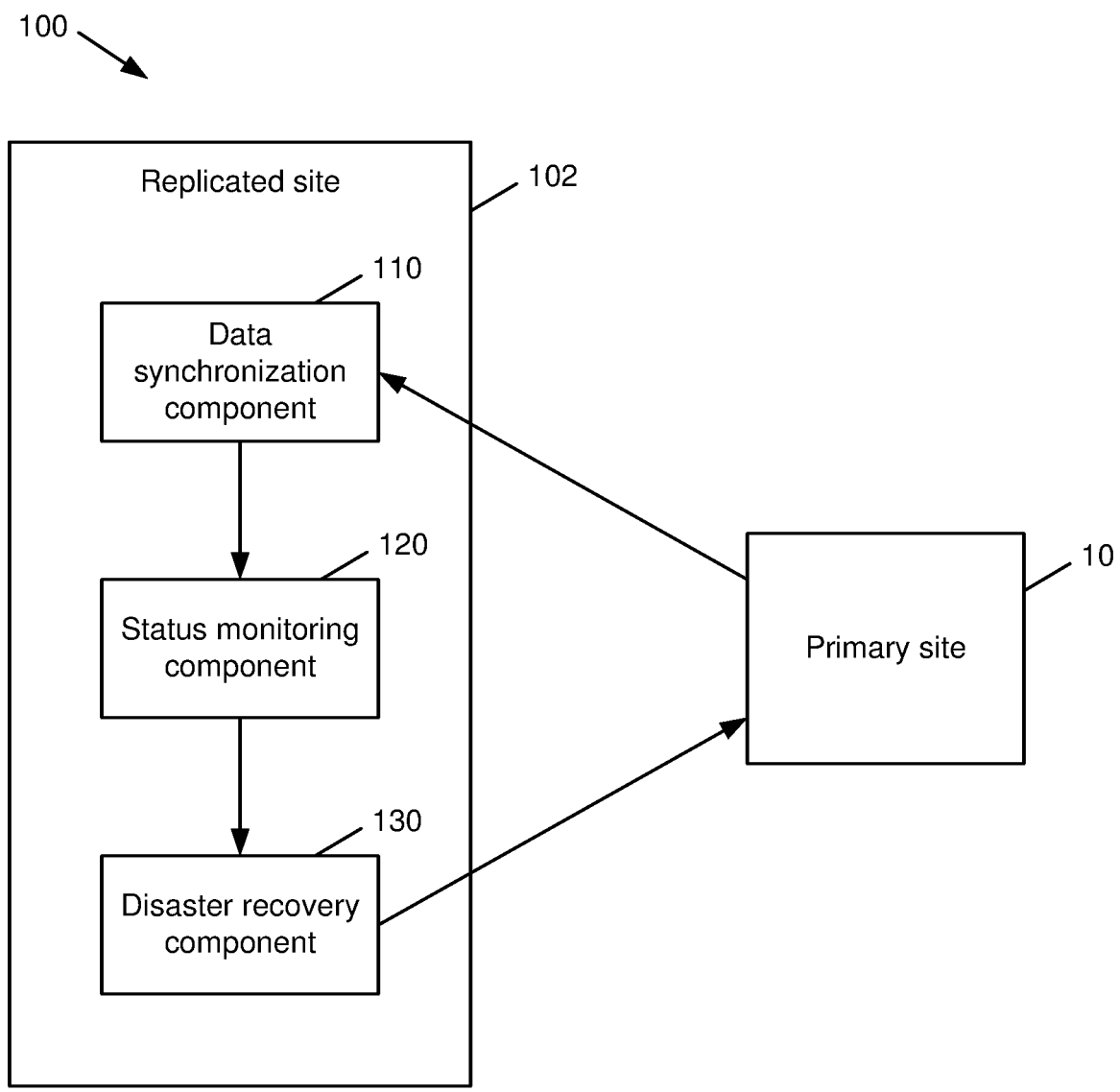
FIG. 1 is a block diagram of a system that facilitates self-contained disaster detection for replicated multi-controller systems in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

Distributed computing systems can operate by allocating various aspects of system functionality to multiple different computing devices, e.g., computing devices connected via a wired and/or wireless network, which can result in significant increases to computing power, storage capacity, data security, and/or other metrics as compared to a single-device system. For instance, a distributed data storage system can include various computing nodes or other devices that can interact with storage arrays and/or other network components via a network. A storage array as utilized in this manner can include multiple storage disks and/or other storage devices that provide high-capacity and highly scalable storage for respective computing nodes in the system. Other distributed computing systems and related devices could also be used.

Additionally, functionality of a distributed computing system can be divided among computing devices located at different physical sites. In such an implementation, devices located at a given site can communicate with devices at other sites through one or more networks such as the Internet, one or more dedicated communication networks, and/or by other suitable means. In a distributed computing system associated with multiple physical sites, information generated and/or altered by one or more devices at a given site can be replicated to devices at other sites. For example, a distributed data storage system can utilize data replication to ensure that stored data as edited and viewed by users of the system at different physical sites is consistent at each of the associated sites.

In an aspect, a site associated with a distributed computing system can be associated with multiple controllers that regulate access to information stored by the system. The site can additionally be configured with controller recovery and/or redundancy such that if up to a given number of controllers fail (e.g., a single controller), recovery can be handled locally at the site. However, in the event that there are more controller failures that can be handled locally by the site, e.g., in the case of a power outage or other total site failure, a disaster can be declared at the site and a disaster recovery procedure can be initiated to transfer control and/or functionality to the replicated data to one or more other, functional sites such that the functioning site(s) can utilize the replicated data available on their data stores to serve clients with minimal client downtime.

As a disaster recovery procedure can be costly in terms of resource usage, access disruption, or the like, it is highly desirable to accurately determine whether a disaster has actually occurred at a given site. Conventionally, some distributed systems monitor for site failures via a software monitor that resides on a device external to the system. However, such an implementation is prone to false positives since interruptions to communication between the software monitor and the system may lead the software monitor to determine that one or more sites have failed. Additionally, such a system introduces delay associated with communicating to one or more functional sites that a site has failed. Moreover, failure of a storage subsystem can be asserted truly by only the storage subsystem itself and not any other external subsystems, such as a network subsystem.

To the foregoing and related ends, various aspects described herein enable various sites of a distributed system to determine the status of respective other sites in the system from data replicated by respective controllers and/or other entities at the respective other sites. In this manner, a site associated with a distributed computing system can identify, confirm, and act upon a peer site failure without intervention from external entities.

Various embodiments described herein can provide one or more advantages that can improve the functionality of a computing system. A non-exhaustive list of such benefits is as follows. Computing resource usage (e.g., processor cycles, network bandwidth, power consumption, etc.) associated with excessive site recovery procedures can be reduced. Response speed to equipment and/or site failures in a distributed computing system can be increased. Overall system uptime can be increased, and access disruptions associated with the system can be reduced. Other advantages that result in improvements to the operation of a computing system are also possible.

With reference now to the drawings, FIG. 1 illustrates a system 100 that facilitates self-contained disaster detection for replicated multi-controller systems in accordance with various aspects described herein. As shown in FIG. 1, system 100 includes a primary production/computing site 10 that can communicate with a remote replicated computing site 102 as described in further detail with respect to the various embodiments that follow. The replicated site 102 shown in system 100 includes a data synchronization component 110 that can replicate data written at the primary site 10. In an aspect, the data synchronization component 110 can utilize one or more data replication technologies to mirror stored data across multiple devices and/or sites of a distributed computing system such that system-related data that is exposed to each device of the system at each physical site is synchronized in real-time or near-real time, resulting in a common set of information over the devices and/or sites. Replication and/or mirroring of data between sites of a distributed computing system is described in further detail below with respect to FIG. 2.

The replicated site 102 of system 100 as shown in FIG. 1 further includes a status monitoring component 120 that can read status identifiers contained in the replicated data generated and/or otherwise obtained by the data synchronization component 110. The status identifiers can include any suitable information, such as timestamps or other timing information, device and/or controller identifiers, network and/or device status information, etc., that can be utilized by the replicated site 102 and its respective components to determine the operational status of an entity from which the status identifiers are received, e.g., the primary site 10. In an aspect, the status identifiers in the replicated data can be originally written, e.g., at the primary site 10 prior to replication via the data synchronization component 110 at a predetermined cadence (e.g., at intervals of a first time period), by respective controllers, directors, or other entities at the primary site 10 that regulate read/write access at the primary site 10.

As further shown in FIG. 1, the replicated site 102 of system 100 additionally includes a disaster recovery component 130 that can initialize a failover procedure (e.g., a site recovery procedure, a disaster recovery procedure, etc.) at the primary site 10 in response to an absence of updates to at least a threshold number of the status identifiers (e.g., as associated with a set of controllers of the primary site 10) within a threshold time interval (e.g., a threshold number of the periods associated with updates to the status identifiers at the primary site 10). In an aspect, the disaster recovery component 130 can be alerted to the absence of updates to the threshold number of status identifiers by the status monitoring component 120. Also or alternatively, the disaster recovery component 130 can itself read the status identifiers to determine whether an absence of updates has occurred.

In an aspect, the failover procedure conducted by the disaster recovery component 130 can involve a complete migration of the functionality of the primary site 10 to the replicated site 102 and/or other sites associated with system 100 such that the functioning site(s) can utilize the replicated data as available on their local data stores to serve clients with minimal client downtime. For instance, as a result of the failover procedure, some or all data, client connections, system functions, etc., previously associated with the primary site 10 can be transferred to the replicated site 102 and/or other sites associated with system 100. Some or all of the functionality transferred from the primary site 10 as a result of the failover procedure can optionally be transferred back to the primary site 10 at a later time, e.g., at a time subsequent to the primary site 10 resuming functionality.

While the data synchronization component 110, status monitoring component 120, and disaster recovery component 130 are described above as local to the replicated site 102, it should be appreciated that similar components and/or related functionality could also be present at the primary site 10 and function in a similar manner to that described herein with respect to the respective components as residing on the replicated site 102. In an aspect, the components 110, 120, 130 as described above can be present at both the replicated (remote) site 102 and the primary site 10, and can function as generally described above at both of said sites. Depending on the relationship between the primary site 10 and the replicated (remote) site 102, present system conditions, and/or other factors, operation of various ones of the components 110, 120, 130 as resident on either the primary site 10 or the replicated site 102 can vary, e.g., the status monitoring component 120 can perform read operations or write operations, and the disaster recovery component 130 can trigger a failover procedure or remain inactive. These interactions, among others, are described in further detail below.

In order to reduce the risk and costs associated with conducting a site recovery procedure from a functional site as described above, the status monitoring component 120 and disaster recovery component 130 can be local to the storage subsystem of one or more sites. For instance, the status monitoring component 120 and/or disaster recovery component 130 can be implemented as a software daemon residing on a storage subsystem at the replicated site 102 and/or a similar system residing at the primary site 10. In doing so, system 100 can reduce or eliminate false positives associated with disaster detection at the primary site 10 and/or the replicated site 102 due to faulty communication between the replicated site 102 and entities external to the replicated site 102 and the primary site 10. Examples of techniques for integrating the status monitoring component 120 and the disaster recovery component 130 into a storage subsystem are described in more detail below with respect to FIGS. 5-6.

In addition, by integrating the status monitoring component 120 with the storage subsystem of an associated computing site, the status monitoring component 120 can separately monitor the operating status of respective controllers associated with the primary site 10, thereby preventing the disaster recovery component 130 from initiating a disaster recovery procedure when a local recovery at the primary site 10 can be conducted. For instance, if the primary site 10 can locally recover from a loss of a single controller, the disaster recovery component 130 can be configured to initiate a controller recovery procedure at the primary site 10 if the status identifiers provided by the primary site 10 indicate that no more than one controller has failed. The primary site 10 could in some cases also initiate such a procedure on its own without instruction from the disaster recovery component 130.

Figure 2:
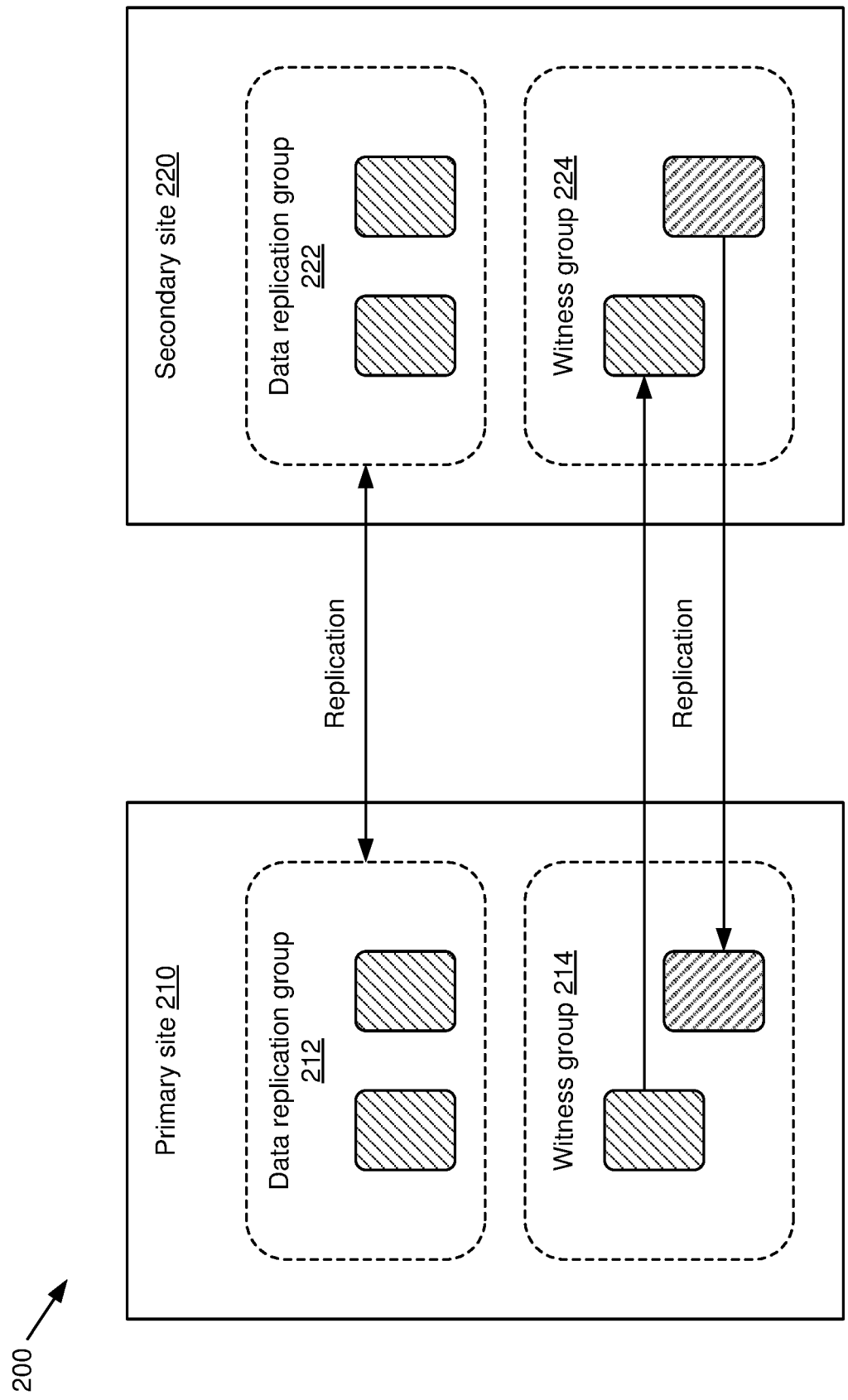
FIG. 2 is a diagram depicting example data replication groups that can be employed in a distributed computing system in accordance with various aspects described herein.

With reference next to FIG. 2, a diagram 200 that depicts depicting example data replication groups that can be employed in a distributed computing system in accordance with various aspects described herein is illustrated. As shown by diagram 200, a distributed computing system can include devices that are located at physically separate sites, here a primary site 210 and a secondary site 220. In an aspect, designation of respective sites as a primary site 210 and a secondary site 220 can occur during pairing by assigning bias attributes and/or other suitable designators for the pair of sites. This bias attribute can subsequently impact operation of the primary site 210 and the secondary site 220. By way of example, the primary site 210 can be designated as a source entity that is read/write accessible, while the secondary site 220 can be designated as a target entity that provides read-only access. This scheme could be used, for instance, in cases where a secondary site 220 is desired to provide data backup and/or other functionality to support the primary site 210. It should be appreciated, however, that the preceding description is intended merely as an example of site configurations that could be utilized in a distributed computing system and that other configurations are also possible. For instance, respective sites in the system can be configured as peer sites and/or other similar site types in which read/write access can be granted to each of the sites. Other configurations are also possible.

As further shown by diagram 200, data associated with respective data replication groups, e.g., data replication group 212 at the primary site 210 and data replication group 222 at the secondary site 220, can be mirrored and/or otherwise synchronized via one or more data replication technologies such that the data replication groups 212, 222 contain substantially the same data at any given time. Thus, for example, changes made to data replication group 212 can be replicated to data replication group 222 in real time or near real time, and vice versa.

As additionally shown by diagram 200, the primary site 210 and the secondary site 220 can have respective witness groups 214, 224, which can be additional data replication groups that contain information relating to the operational status of their corresponding sites. For instance, the witness groups 214, 224 can include status identifiers and/or other status information as written by respective controllers associated with the primary site 210 and/or secondary site 220. In an aspect, information associated with the witness groups 214, 224 can be replicated between the primary site 210 and the secondary site 220 in a similar manner to that described above with respect to the data replication groups 212, 222. Unlike the data replication groups 212, 222, however, the witness groups 214, 224 can be configured via one-way replication, e.g., such that only one of the primary site 210 or the secondary site 220 is permitted to write to a given witness group 214, 224. For instance, diagram 200 illustrates a pair of one-way replication arrangements between the primary site 210 and the secondary site 220, notably a first replication link from the witness group 214 of the primary site 210 to the witness group 224 of the secondary site 220 (shown via the topmost arrow) and a second replication link from the witness group 224 of the secondary site 220 to the witness group 214 of the primary site 210 (shown via the bottommost arrow). Other communications between the primary site 210 and the secondary site 220 are also possible.

In an aspect, the data replication groups 212, 222 and witness groups 214, 224 can be composed of one or more physical or logical groupings of data (e.g., as illustrated by line-shaded regions in FIG. 2). These can include, but are not limited to, physical storage drives and/or groups of storage drives (e.g., disk arrays or the like) as well as portions of physical drives such as partitions and/or logical units (LUNs). In some cases, there can be more than one degree of division of a physical storage drive. For instance, a LUN created from a physical drive can further be divided into partitions and/or other segments. Other schemes for containing data could also be used.

Returning to FIG. 1, and with further reference to FIG. 2, the illustrated components 110, 120, 130 of the replicated site 102 can be implemented, wholly or in part, by a hypervisor at the replicated site 102 that can generate guest instances for accessing information stored by the distributed system, e.g., within data replication groups 212, 222. In an aspect, the hypervisor can be localized within the storage infrastructure of the system of a given site and provide continuous monitoring of its associated site and initiate failover of data objects from an active site to a replicated site in the event of a primary site disaster. Since the hypervisor is localized within the storage subsystem, such an implementation can enable storage subsystem failures to be detected via the storage infrastructure itself, e.g., without external agents or software being installed on resources outside of the storage devices being monitored. This, in turn, can reduce user involvement in the failure detection process, improve user experience, and increase response speed to failure events, among other benefits.

In an aspect, data replication as shown by FIG. 2 can be established as follows. First, replication can be established between a pair of computing sites, e.g., the primary site 210 and the secondary site 220 as shown by FIG. 2. Next, a first LUN can be created, e.g., by a hypervisor associated with the distributed system, and exposed to guests hosted on respective controllers at the primary site 210. A similar process can be conducted to create and expose a second LUN at the secondary site 220. Upon establishing the LUNs at the primary site 210 and the secondary site 220, the LUNs can be designated as witness LUNs, e.g., LUNs of the witness groups 214, 224. A replication session can then be established between the LUNs of the respective sites 210, 220.

Figure 3:
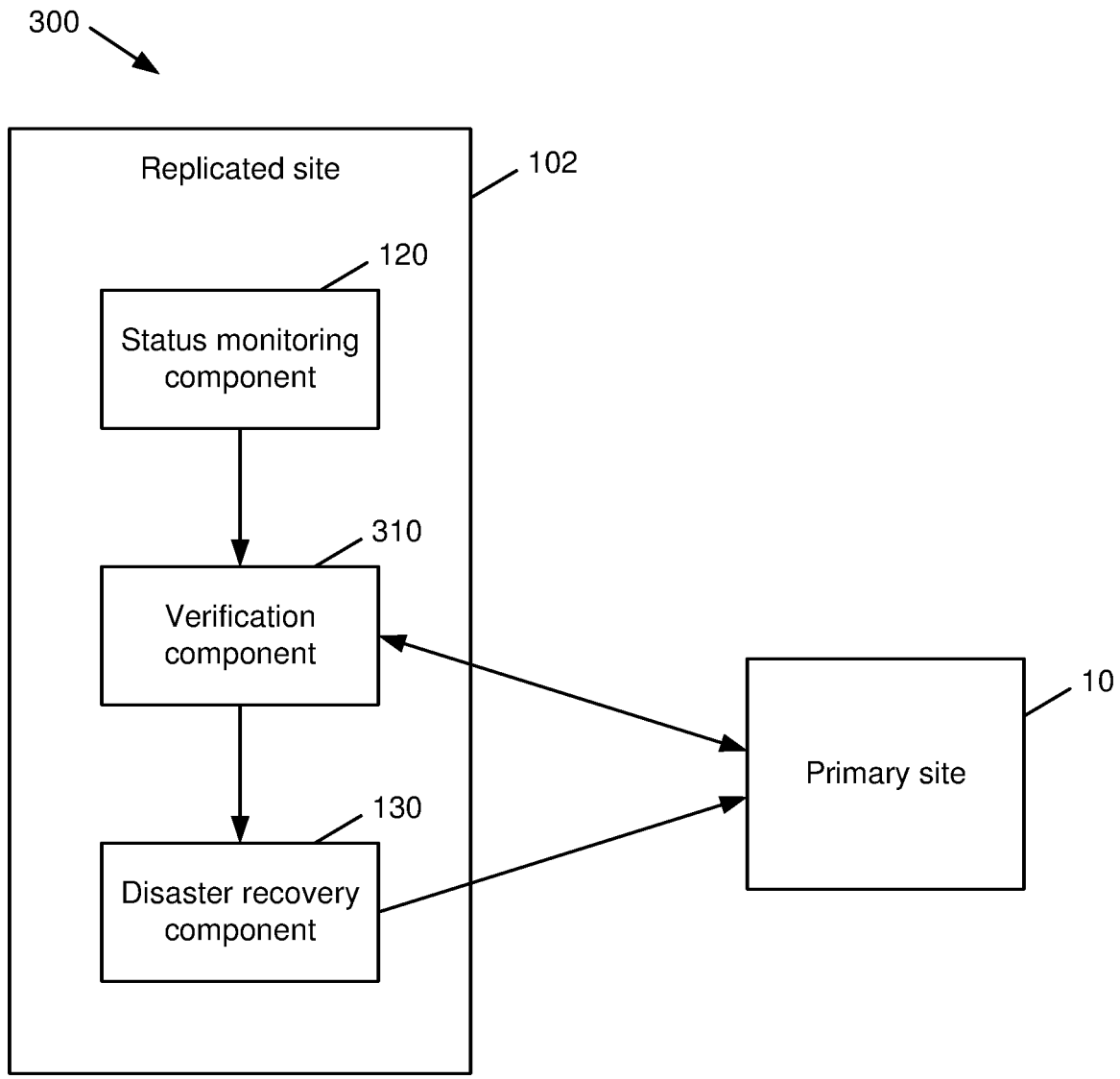
FIG. 3 is a block diagram of a system that facilitates disaster detection and verification for a replicated multi-controller system in accordance with various aspects described herein.

Turning next to FIG. 3, a block diagram of a system 300 that facilitates disaster detection and verification for a replicated multi-controller system in accordance with various aspects described herein is illustrated. Repetitive description of like elements employed in other embodiments described herein is omitted for brevity. As shown in FIG. 3, system 300 includes a replicated site 102 that can operate in a similar manner to that described above with respect to FIG. 1. The replicated site 102 can include a verification component 310 that can confirm a site failure at the primary site 10 in response to an absence of status updates received from a threshold number of controllers at the primary site 10, e.g., more than one controller within a threshold time interval, e.g., as processed by the status monitoring component 120 in the manner described above with respect to FIG. 1, thereby resulting in the primary site 10 being deemed non-operational. In an aspect, operation of the verification component 310 can be triggered by the status monitoring component 120 and/or other appropriate entities to independently confirm that a site failure at the primary site 10 has occurred prior to taking remedial action. Verification measures that can be taken by the verification component 310 can include, communicating over Internet Protocol (IP) to the primary site 10 to validate if it is alive. By way of example, this can include submitting one or more requests to the primary site 10 for an acknowledgement or other responsive message, submitting or repeating a request for updated status identifiers, and/or any other suitable action(s). In another aspect, the disaster recovery component 130 can be configured to initialize a failover procedure at the primary site 10 only if the verification component 310 successfully confirms the site failure at the primary site 10 (e.g., the verification component 310 is unable to receive confirmation from the primary site 10 that the primary site 10 is operational, etc.). In doing so, the likelihood of the disaster recovery component 130 initializing a failover procedure unnecessarily can be further reduced.

Figure 4:
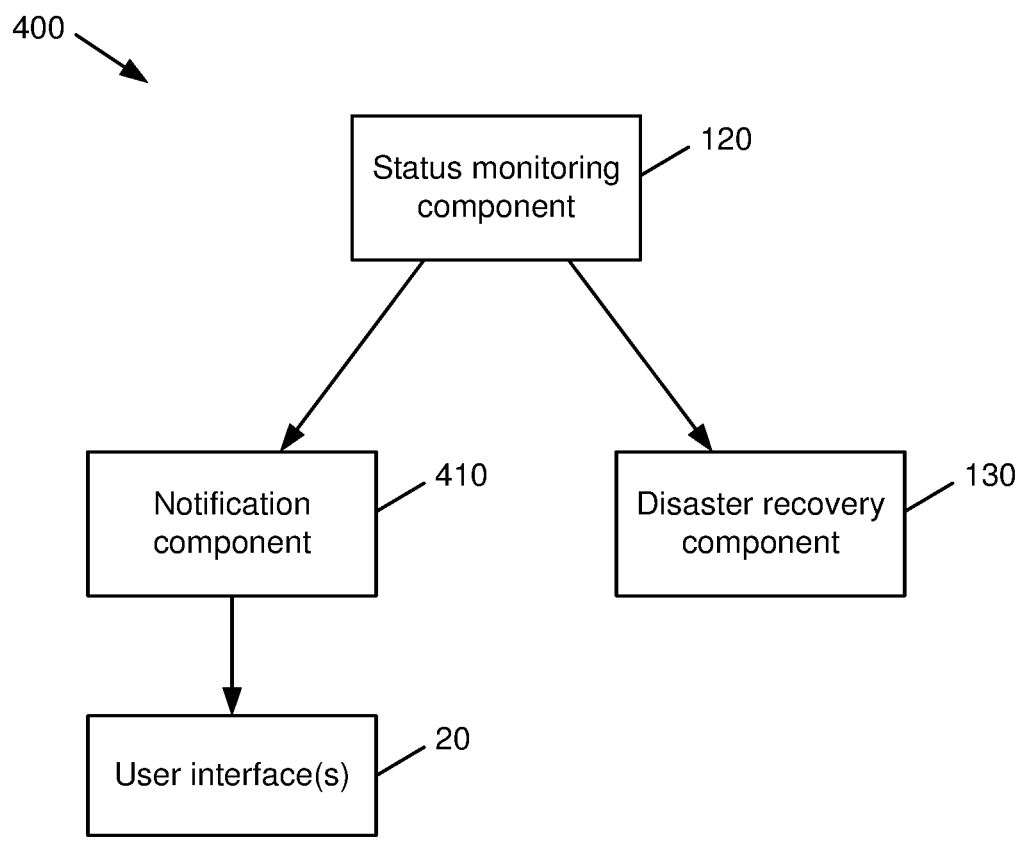
FIG. 4 is a block diagram of a system that facilitates user notifications associated with disaster detection and recovery in a replicated multi-controller system in accordance with various aspects described herein.

Referring next to FIG. 4, a block diagram of a system 400 that facilitates user notifications associated with disaster detection and recovery in a replicated multi-controller system in accordance with various aspects described herein is illustrated. Repetitive description of like elements employed in other embodiments described herein is omitted for brevity. System 400 as shown in FIG. 4 includes a notification component 410, which can generate a user notification in response to failure conditions at one or more associated computing sites, e.g., in response to the absence of updates to status identifiers as written by a primary site 10 (e.g., as replicated by the data synchronization component 110 and/or monitored by the status monitoring component 120). In an aspect, a user notification generated by the notification component 410 can be provided to a system administrator and/or other system user(s) via one or more user interfaces 20. The system interface(s) 20 can include, but are not limited to, a graphical interface, a text log such as an event log, a short message service (SMS) notification, etc. In an aspect, the notification component 410 can also be configured to assist the verification component 310 in verifying that a site failure has occurred at a primary site 10, e.g., by alerting a system administrator to a potential site failure in order to enable the system administrator to verify the failure and/or manually take one or more appropriate remedial actions.

Simultaneously or near simultaneously to a notification as provided by the notification component 410 as described above, the disaster recovery component 130 can automatically initiate a disaster recovery on a remote site, e.g., the primary site 10 as described above, after having asserted that a disaster has occurred on that site, as described according to various aspects given above.

Figure 5:
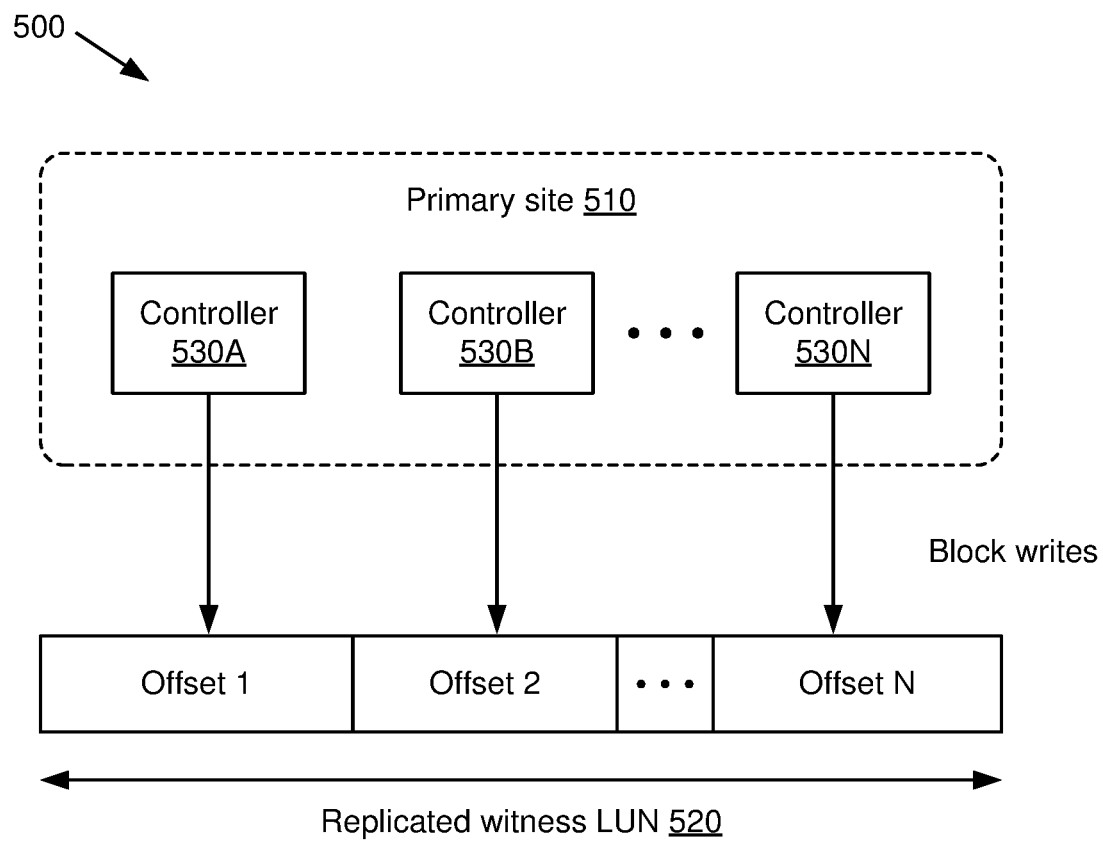
FIG. 5 is a diagram depicting example status identifiers that can be written by a primary site of a replicated multi-controller system in accordance with various aspects described herein.
Figure 6:
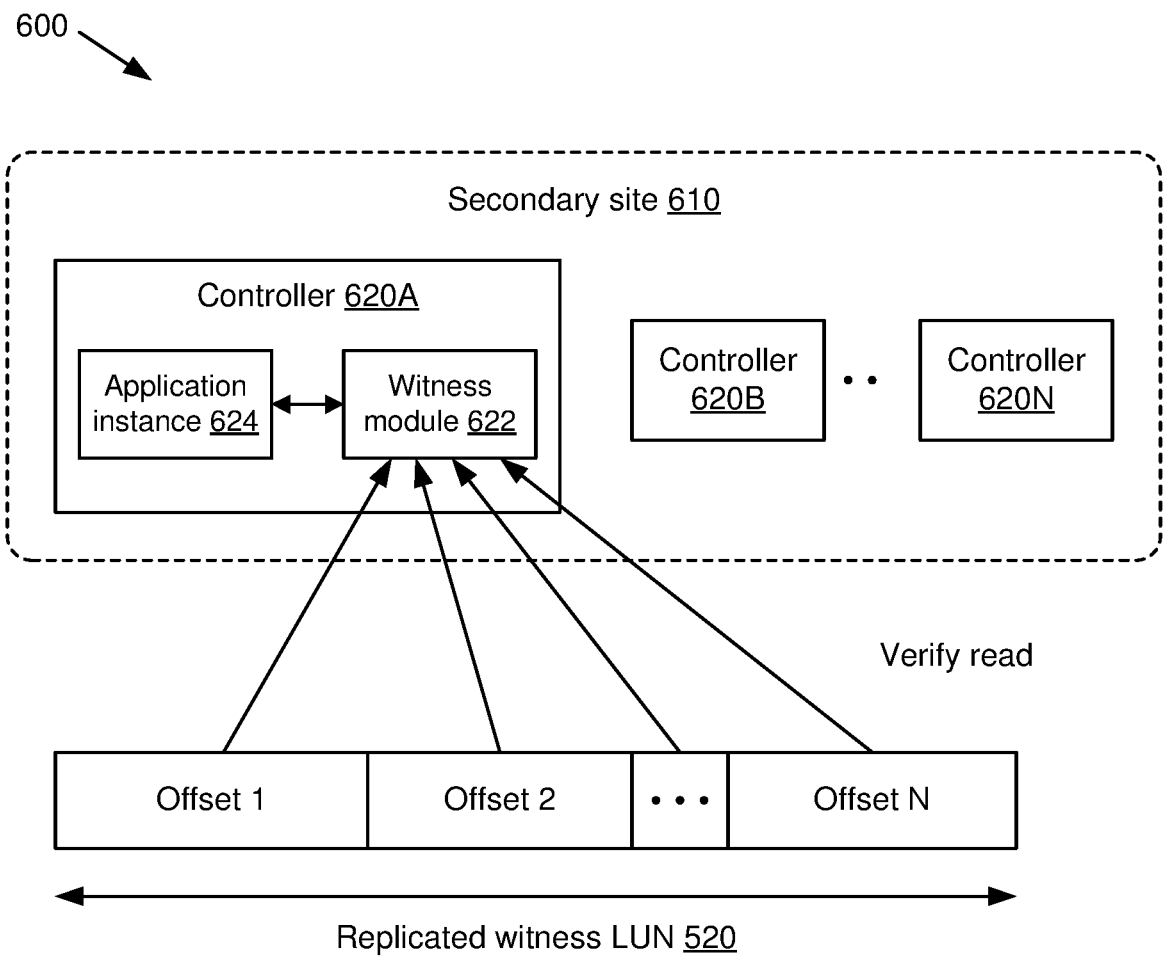
FIG. 6 is a diagram depicting example status identifiers that can be read and verified by a peer site of a replicated multi-controller system in accordance with various aspects described herein.

Referring next to FIGS. 5-6, respective examples of techniques that can be utilized to generate and process status identifiers in accordance with various aspects herein are illustrated. It should be appreciated, however, that the examples shown in FIGS. 5-6 constitute merely one example technique for generating and processing status identifiers, and that other techniques could be used without departing from the aspects described herein or the claimed subject matter.

In an aspect, the example technique illustrated by FIGS. 5-6 illustrate a system architecture in which disaster detection software, also referred to herein as witness software, is implemented by a guest or virtual machine installed on a hypervisor hosted on a primary site 510 as shown by FIG. 5 and a secondary site 610 as shown by FIG. 6. With specific reference now to FIG. 5, the disaster detection software can partition the space of a designated witness LUN 520 into equal partitions or other segments, where the number of segments in the witness LUN 520 matches the number of controllers 530A-530N associated with the primary site 510. It should be appreciated that the labeling convention utilized for controllers 530A-530N in FIG. 5, as well as for additional elements as described later, is merely for clarity of illustration and is not intended to imply a specific number of controllers 530A-530N and/or other elements. Rather, such groups of elements can include any suitable number of elements, including one element or multiple elements.

In an aspect, the disaster detection software can be configured in a write-only mode on the primary site 510 such that the disaster detection software on the primary site 510 can run on and independently monitor each controller 530 associated with the primary site. As further shown by diagram 500, the disaster detection software at each of the controllers 530A-530N can direct the corresponding controllers 530A-530N to write a status identifier and/or any other suitable site identifier data via block writes to the segments of the witness LUN 530 corresponding to the respective controllers 530A-530N. Alternatively, the disaster detection software can direct block writes by only controllers 530A-530N on which one or more relevant applications are hosted (e.g., applications corresponding to active guest instances), and/or any other suitable subset of the controllers 530A-530N.

Information that can be included in the status identifiers can include, but are not limited to, a timestamp or other indicator of a current system time, an identifier corresponding to the particular controller 530A-530N that wrote the status identifier, and/or other suitable information. Information corresponding to respective controllers 530A-530N can additionally include a site identifier corresponding to the primary site 510, which can be utilized to aid the secondary site 610 in determining the originating site of the status identifiers in the event that the secondary site 610 is paired to multiple other sites. Also or alternatively, the status identifiers and/or other information can be encrypted via one or more techniques that can be decrypted at the secondary site 610 subsequent to replication.

Referring next to FIG. 6, the disaster detection software can be configured in a read-only mode at the secondary site 610 such that the software runs on only respective ones of the controllers 620A-620N at the secondary site that are marked as master controllers, here controller 620A. As shown by FIG. 6, the disaster detection software can be implemented by a witness module 622 at controller 620A that communicates with one or more application instances 624 associated with controller 620A (e.g., applications corresponding to active guest instances).

In an aspect, the disaster detection software running on the primary site 510 and secondary site 610 can continuously exchange status identifier data via replication, and the witness module 622 on the secondary site 620 can monitor for state changes of each of the controllers hosted at the primary site 510. For instance, the witness module 622 can trigger a verify read procedure on respective ones of the offsets (e.g., some or all of the offsets) upon determining that the state identifiers corresponding to at least one of the controllers on their associated offsets are stale, e.g., have not updated within a threshold time interval, within a specified cadence, e.g., at periods of a time interval. At this time, the witness module 622 can also generate a warning (e.g., via the notification component 410). Further, if more than a threshold number of status identifiers across the respective segments of the witness LUN 520 are determined to be stale, the witness module 622 can cause the system to enter an error condition. The error condition can indicate one or more failures that can include, but are not limited to, the following:

1) Site Disaster—Multi-controller failure
2) One or more controllers on the primary site 510 have failed
3) One or more guests/other instances hosted on the primary site 510 have failed
4) Replication links between the primary site 510 and the secondary site 610 have failed In the event that one or more of the above failures have occurred, the witness module 622 can trigger a tertiary verification call from a different subsystem (e.g., a non-storage subsystem) to assert that the primary production/computing site 510 has failed. For instance, this can include a communication over IP to the primary site 510. If this tertiary communication fails, the witness module 622 can then issue a disaster warning to the application instance 624 residing on the master controller 620A, which can take one or more necessary actions to initiate a failover procedure for one or all objects it hosts.

Figure 7:
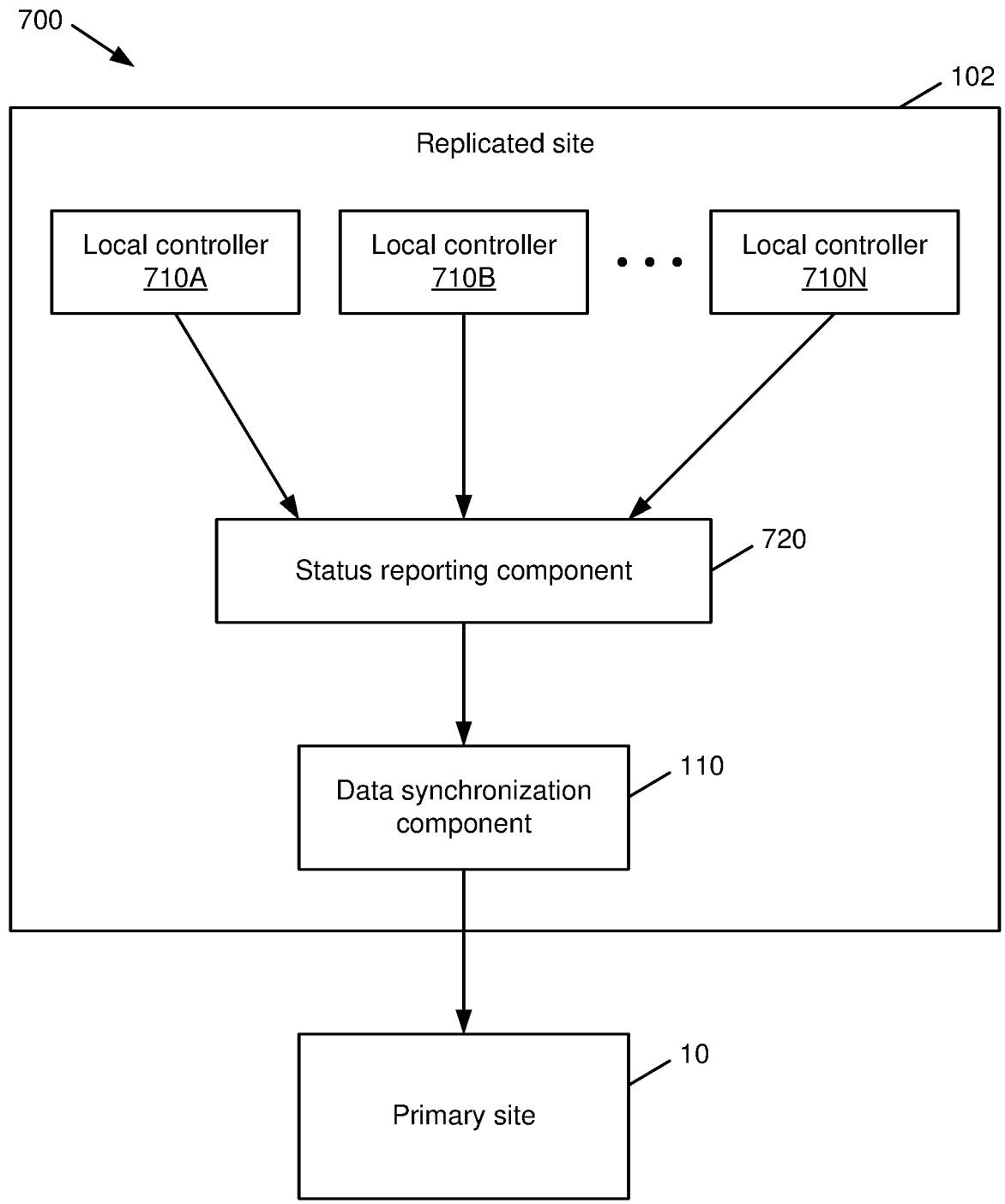
FIG. 7 is a block diagram of a system that facilitates status reporting by a computing site in a replicated multi-controller system in accordance with various aspects described herein.

Turning next to FIG. 7, a block diagram of a system 700 that facilitates status reporting by a computing site in a replicated multi-controller system in accordance with various aspects described herein is illustrated. Repetitive description of like elements employed in other embodiments described herein is omitted for brevity. As shown in FIG. 7, system 700 includes one or more local controllers 710A-710N that can generate status identifiers and/or other status information. In an aspect, the local controllers 710A-710N can, either individually or with the aid of a status reporting component 720, generate status identifiers corresponding to the respective local controllers 710A-710N. For instance, the local controllers 710A-710N and/or the status reporting component 720 can generate status identifiers in a similar manner to that described above with respect to FIG. 5. These status identifiers and/or other information can then be transferred (e.g., via replication) to a primary site 10 via a data synchronization component 110, which can operate in a similar manner to that described above with respect to FIG. 1.

Figure 8:
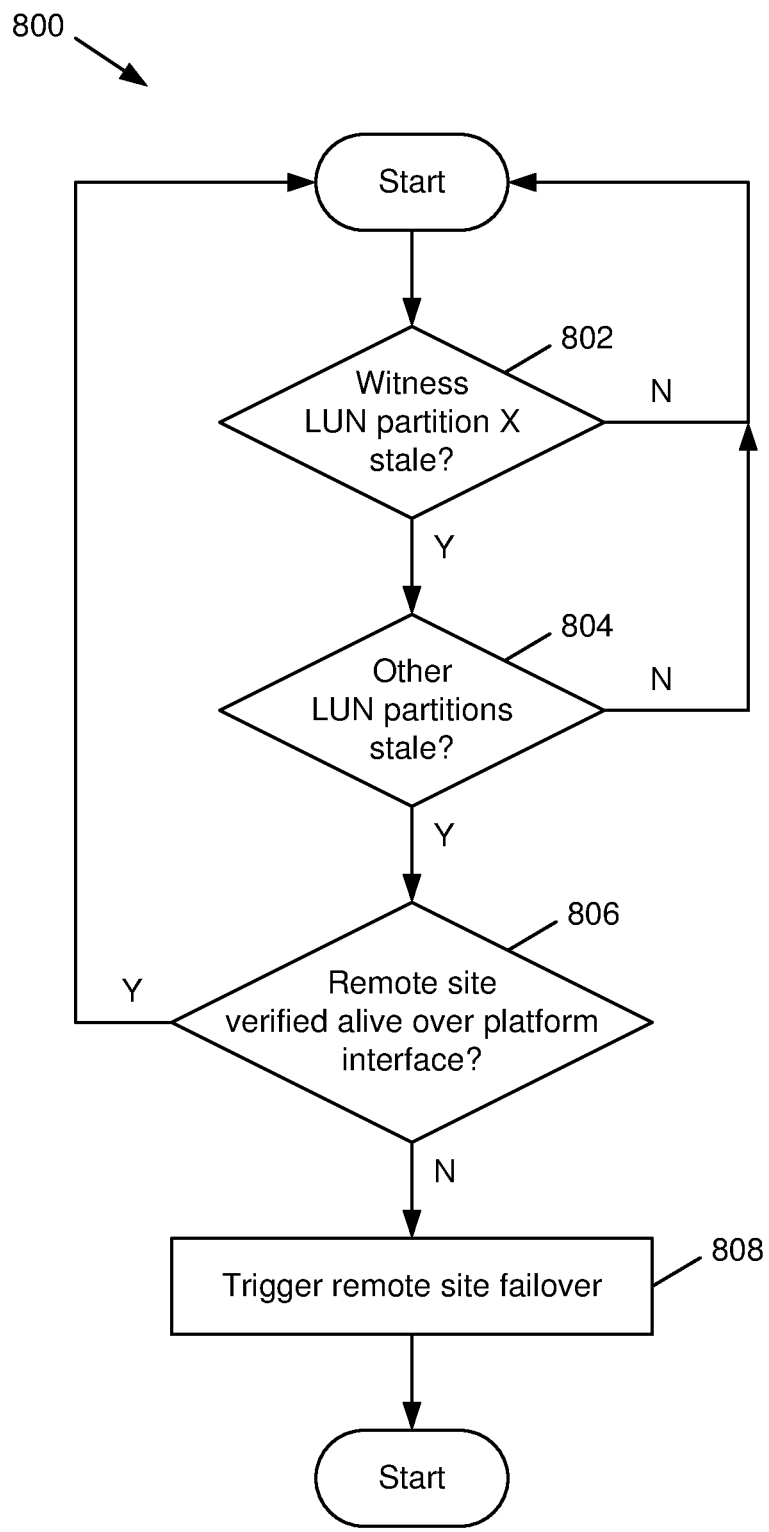
FIG. 8 is a flow diagram of a method that facilitates an example workflow for disaster detection and verification in a replicated multi-controller system in accordance with various aspects described herein.

Turning now to FIG. 8, illustrated is a flow diagram of a method 800 that facilitates an example workflow for disaster detection and verification in a replicated multi-controller system in accordance with various aspects described herein. While various actions performed in connection with method 800 are described with respect to the primary site 510 shown in FIG. 5 and the secondary site 610 shown in FIG. 6, it should be appreciated that method 800 could also be performed by other architectures in a similar manner Prior to the actions shown in method 800, witness software on a primary site can write status identifier information into predefined partitions of a witness LUN, where the number of partitions is equal to the number of controllers at the primary site. Method 800 then starts at 802, where witness software at a secondary site reads a given partition X of the witness LUN to check whether the status identifier in said partition is stale. As used here, a stale status identifier in a given partition can indicate, among other things, that the corresponding controller on the primary site 10 has faulted and, as a result, could be unavailable to serve data to the client. In an aspect, the amount of time that can elapse without updates to a status identifier until the status identifier is regarded as stale can be based on respective factors such as storage and/or communication protocols used by the system, a fault tolerance as specified by the system or a system administrator, an uptime goal associated with the system (e.g., four nines, six nines, etc.), and/or other suitable factors. Such a time interval can be static or dynamically alterable over time based on changing system needs or other factors.

In an aspect, all registered partitions on the replicated witness LUN, e.g., replicated witness LUN 520 as shown in FIGS. 5-6, can be verified in parallel. If the status identifier at partition X is not determined to be stale at 802, method 800 can restart for another partition of the witness LUN and/or a later update to the status identifiers. If the status identifier at partition X of the witness LUN is identified as stale at 802, method 800 proceeds to 804, in which the witness software checks the remaining status identifiers on the other partitions of the witness LUN. If no other status identifiers are determined at 804 to be stale, method 800 can restart as described above, and a warning regarding the stale status identifier found at 802 can optionally be issued (e.g., by the notification component 410).

If multiple status identifiers are found to be stale at 804, method 800 can proceed to 806, in which the witness software can trigger an event to its hosted application. The application can, in turn, verify using its own interfaces whether the peer site is alive (e.g., the peer site has not undergone a disaster). If the peer site is not verified as alive at 806, method 800 can proceed to 808, in which the application can trigger a failover of the peer site by issuing appropriate failover actions. Otherwise, method 800 can restart as described above, and a warning regarding the triggered event can optionally be issued (e.g., by the notification component 410).

Figure 9:
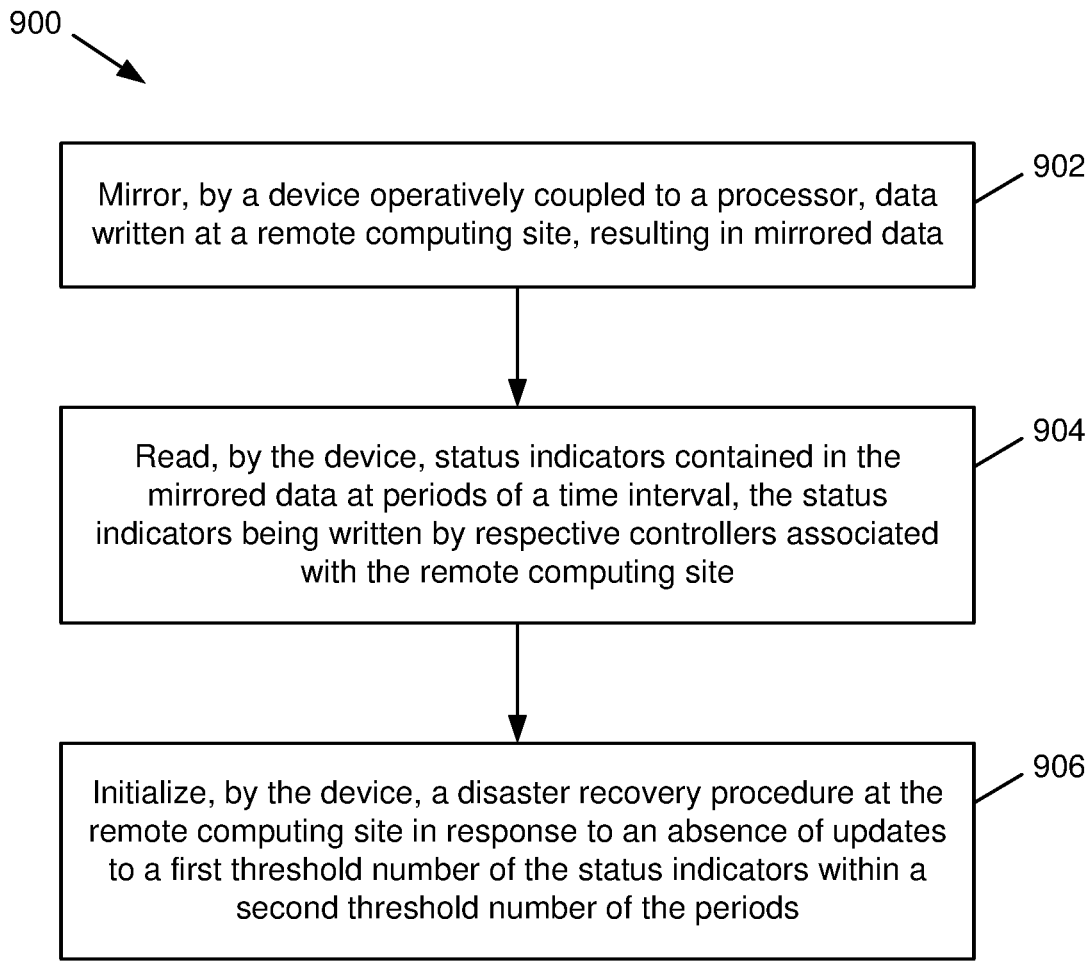
FIG. 9 is a flow diagram of a method that facilitates self-contained disaster detection for replicated multi-controller systems in accordance with various aspects described herein.

Referring next to FIG. 9, a flow diagram of a method 900 that facilitates self-contained disaster detection for replicated multi-controller systems in accordance with various aspects described herein. At 902, a device operatively coupled to a processor (e.g., a device associated with a replicated site 102) can mirror (e.g., by a data synchronization component 110) data written at a primary computing site, resulting in mirrored data from the primary computing site.

At 904, the device can read (e.g., by a status monitoring component 120) status indicators contained in the mirrored data obtained at 902 at periods of a time interval. In an aspect, the status indicators can be written by respective controllers at the primary computing site.

At 906, the device can initialize (e.g., by a disaster recovery component 130) a disaster recovery procedure at the primary computing site in response to an absence of updates to at least a first threshold number of the status indicators read at 904 within a second threshold number of the periods utilized for reading the status indicators at 904.

FIGS. 8-9 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 10:
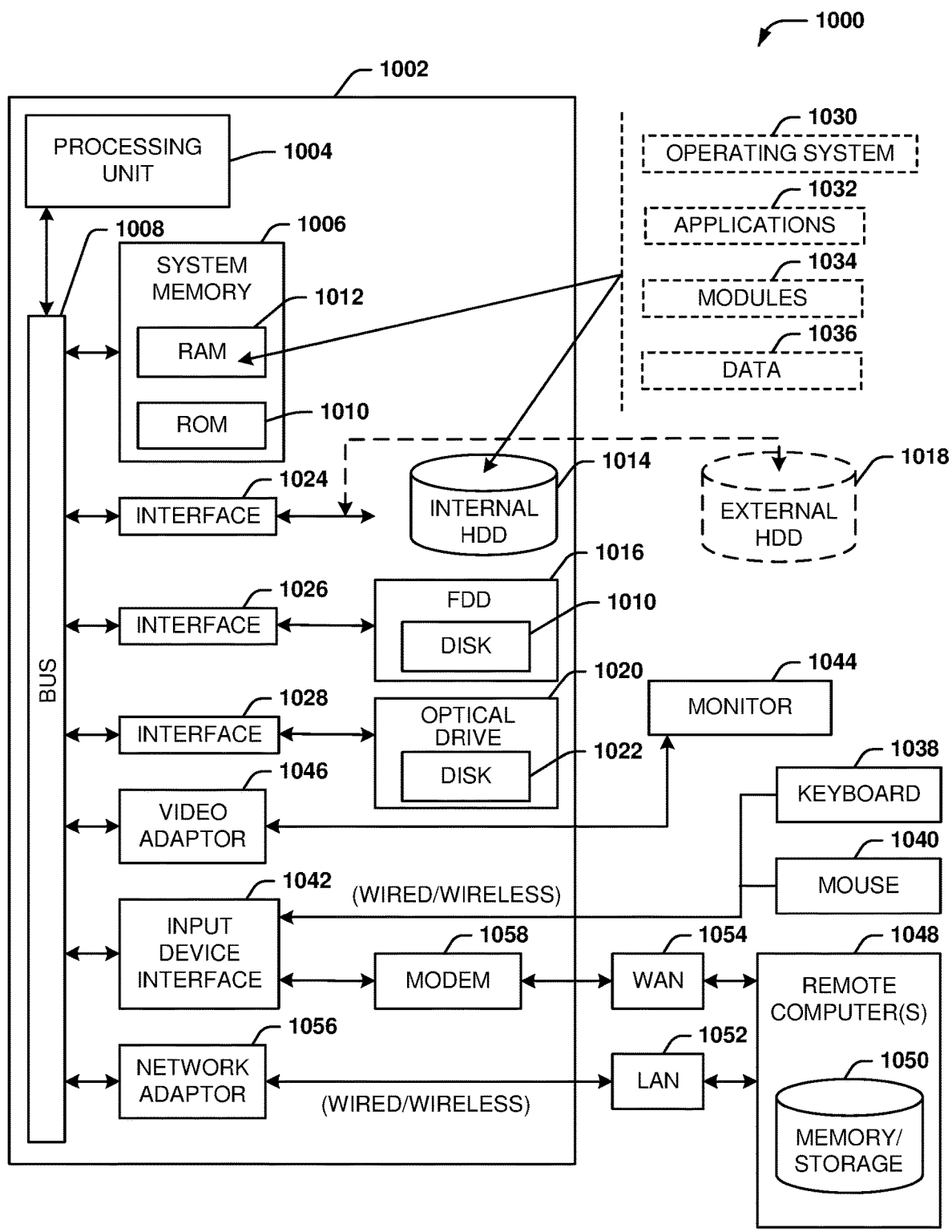
FIG. 10 is a diagram of an example computing environment in which various embodiments described herein can function.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). While the internal HDD 1014 is illustrated as located within the computer 1002, the internal HDD 1014 can also be configured for external use in a suitable chassis (not shown). The HDD 1014, magnetic FDD 1016 and optical disk drive 1020 can be connected to the system bus 1008 by an HDD interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a USB port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless access point (AP) disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
    a memory that stores executable components; and
    a processor that executes the executable components stored in the memory, wherein the executable components comprise:
        a data synchronization component that replicates data written at a primary production site, resulting in replicated data from the primary production site;
        a status monitoring component that reads status identifiers contained in the replicated data at periods of a time interval, wherein the status identifiers are written by respective controllers at the primary production site; and
        a disaster recovery component that initializes a failover procedure at the primary production site in response to an absence of updates to a first threshold number of the status identifiers within a second threshold number of the periods.

2. The system of claim 1, wherein the first threshold number of the status identifiers comprises at least two status identifiers.

3. The system of claim 2, wherein the disaster recovery component initializes a controller recovery procedure at the primary production site in response to the absence of at least some of the updates to at least one of the status identifiers and less than the first threshold number of the status identifiers within the second threshold number of the periods.

4. The system of claim 1, wherein the executable components further comprise:
    a verification component that confirms a primary site failure at the primary production site in response to the absence of the updates from the primary production site to the first threshold number of the status identifiers within the second threshold number of the periods, wherein the disaster recovery component initializes the failover procedure at the primary production site further in response to the verification component confirming the primary site failure at the primary production site.

5. The system of claim 1, wherein the executable components further comprise:
    a notification component that generates a user notification in response to the absence of at least some of the updates to at least one of the status identifiers within the second threshold number of the periods.

6. The system of claim 1, wherein the status identifiers comprise a timestamp.

7. The system of claim 1, wherein the primary production site comprises a storage array, and wherein the replicated data is written by the primary production site to a logical unit of the storage array.

8. The system of claim 7, wherein the logical unit is divided into a group of partitions, and wherein the status identifiers are written by the respective controllers associated with the primary production site to respective ones of the group of partitions.

9. The system of claim 1, wherein the status identifiers are first status identifiers, and wherein the executable components further comprise:
a status reporting component that generates respective second status identifiers corresponding to respective local controllers.

10. The system of claim 9, wherein the data synchronization component replicates the second status identifiers to the primary production site.

11. A method, comprising:
mirroring, by a device operatively coupled to a processor, data written at a primary computing site, resulting in mirrored data from the primary computing site;
reading, by the device, status indicators contained in the mirrored data at periods of a time interval, wherein the status indicators are written by respective controllers at the primary computing site; and
initializing, by the device, a disaster recovery procedure at the primary computing site in response to an absence of updates to a first threshold number of the status indicators within a second threshold number of the periods.

12. The method of claim 11, wherein the first threshold number of the status indicators comprises at least two status identifiers, and wherein the method further comprises:
initializing a controller recovery procedure at the primary computing site in response to the absence of at least some of the updates to at least one of the status indicators and less than the first threshold number of the status indicators within the second threshold number of the periods.

13. The method of claim 11, further comprising:
confirming, by the device, a primary site failure at the primary computing site in response to the absence of the updates from the primary computing site to the first threshold number of the status identifiers within the second threshold number of the periods, wherein the initializing the disaster recovery procedure comprises initializing the disaster recovery procedure at the primary computing site further in response to the confirming.

14. The method of claim 11, wherein the status indicators comprise a timestamp.

15. The method of claim 11, wherein the primary computing site comprises a storage array, and wherein the mirrored data is written by the primary computing site to a logical unit of the storage array.

16. The method of claim 15, wherein the logical unit is divided into a group of partitions, and wherein the status indicators are written by the respective controllers associated with the primary computing site to respective ones of the group of partitions.

17. A machine-readable storage medium comprising executable instructions that, when executed by a processor of a replicated computing site, facilitate performance of operations, the operations comprising:
creating a local copy of data written at a primary computing site;
reading status identifiers contained in the local copy of the data written at the primary computing site at periods of a time interval, wherein the status identifiers are written by respective controllers at the primary computing site; and
triggering a disaster recovery procedure at the primary computing site in response to an absence of updates to a first threshold number of the status identifiers within a second threshold number of the periods.

18. The machine-readable storage medium of claim 17, wherein the first threshold number of the status identifiers comprises at least two status identifiers, and wherein the operations further comprise:
triggering a controller recovery procedure at the primary computing site in response to the absence of at least some of the updates to at least one of the status identifiers and less than the first threshold number of the status identifiers within the second threshold number of the periods.

19. The machine-readable storage medium of claim 17, wherein the operations further comprise:
confirming a primary site failure at the primary computing site in response to the absence of the updates to the first threshold number of the status identifiers within the second threshold number of the periods; and
triggering the disaster recovery procedure at the primary computing site further in response to the confirming.

20. The machine-readable storage medium of claim 17, wherein the primary computing site comprises a storage array, wherein the data written at the primary computing site is written to respective partitions of a logical unit of the storage array, and wherein the status identifiers are written by the respective controllers associated with the primary computing site to the respective partitions.

* * * * *